US009734399B2

(12) United States Patent
Flores et al.

(10) Patent No.: US 9,734,399 B2
(45) Date of Patent: Aug. 15, 2017

(54) CONTEXT-AWARE OBJECT DETECTION IN AERIAL PHOTOGRAPHS/VIDEOS USING TRAVEL PATH METADATA

(71) Applicant: The Boeing Company, Chicago, IL (US)

(72) Inventors: Arturo Flores, La Jolla, CA (US); Kyungnam Kim, Oak Park, CA (US); Yuri Owechko, Newbury Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 783 days.

(21) Appl. No.: 14/247,398

(22) Filed: Apr. 8, 2014

(65) Prior Publication Data

US 2015/0286868 A1 Oct. 8, 2015

(51) Int. Cl.
*G06K 9/00* (2006.01)
*B64D 47/08* (2006.01)
*G06K 9/62* (2006.01)
*G06T 7/38* (2017.01)
*G06T 7/194* (2017.01)
*G06T 7/136* (2017.01)

(52) U.S. Cl.
CPC ......... *G06K 9/00651* (2013.01); *B64D 47/08* (2013.01); *G06K 9/00744* (2013.01); *G06K 9/6215* (2013.01); *G06T 7/136* (2017.01); *G06T 7/194* (2017.01); *G06T 7/38* (2017.01); *G06T 2207/10016* (2013.01); *G06T 2207/10032* (2013.01); *G06T 2207/20224* (2013.01)

(58) Field of Classification Search
None
See application file for complete search history.

(56) References Cited

U.S. PATENT DOCUMENTS

2009/0321636 A1* 12/2009 Ragucci ............... G01S 19/14
250/330
2012/0062732 A1 3/2012 Marman et al.
(Continued)

OTHER PUBLICATIONS

C. Guilmart, et al., "Context-Driven Moving Object Detection in Aerial Scenes with User Input," 2011 18th IEEE International Conference on Image Processing, pp. 1781-1784.
(Continued)

*Primary Examiner* — Jason Heidemann
(74) *Attorney, Agent, or Firm* — Patterson + Sheridan, LLP

(57) ABSTRACT

A system and a method for real-time detection of a moving object on a travel path in a geographical area is provided. The system and method may also be used to track such a moving object in real-time. The system includes an image capturing device for capturing successive images of a geographical area, a geographical reference map comprising contextual information of the geographical area, and a processor configured to calculate differences between successive images to detect, in real-time, a moving object on the travel path. The method includes capturing successive images of the geographical area using the image capturing device, geo-registering at least some of the successive images relative to the geographical reference map, and calculating differences between the successive images to detect, in real-time, an object.

19 Claims, 6 Drawing Sheets

(56) References Cited

U.S. PATENT DOCUMENTS

| | | | | |
|---|---|---|---|---|
| 2012/0140767 | A1* | 6/2012 | Brothers | H04L 12/66 370/352 |
| 2012/0304085 | A1* | 11/2012 | Kim | G08B 13/19671 715/763 |
| 2013/0021475 | A1* | 1/2013 | Canant | H04N 5/33 348/144 |
| 2014/0347475 | A1* | 11/2014 | Divakaran | G06K 9/00771 348/135 |

OTHER PUBLICATIONS

Yuping Lin et al., "Map-Enhanced UAV Image Sequence Registration and Synchronization of Multiple Image Sequences," 2007 IEEE.

Jiangjian Xiao et al: "Vehicle detection and tracking in wide field-of-view aerial video", 2010 IEEE Conference on Computer Vision and Pattern Recognition (CVPR), Jun. 13-18, 2010, San Francisco, CA, USA, IEEE, Piscataway, NJ USA, Jun. 13, 2010 (Jun. 13, 2010), pp. 679-684.

Shih-Ming Huang et al: "Image registration among UAV image sequence and Google satellite image under quality mismatch", Its Telecommunications (ITST), 2012 12th International Conference on, IEEE, Nov. 5, 2012 (Nov. 5, 2012), pp. 311-315.

Li Jing et al: "Moving Vehicle Detection in Dynamic Background from Airborne Monocular Camera", 2013 5th International Conference on Intelligent Human-Machine Systems and Cybernetics, IEEE, vol. 1, Aug. 26, 2013 (Aug. 26, 2013), pp. 560-563.

Deepak Khosla et al: "A neuromorphic system for object detection and classification", Proceedings of SPIE, vol. 8745, May 23, 2013 (May 23, 2013), p. 87450X.

* cited by examiner

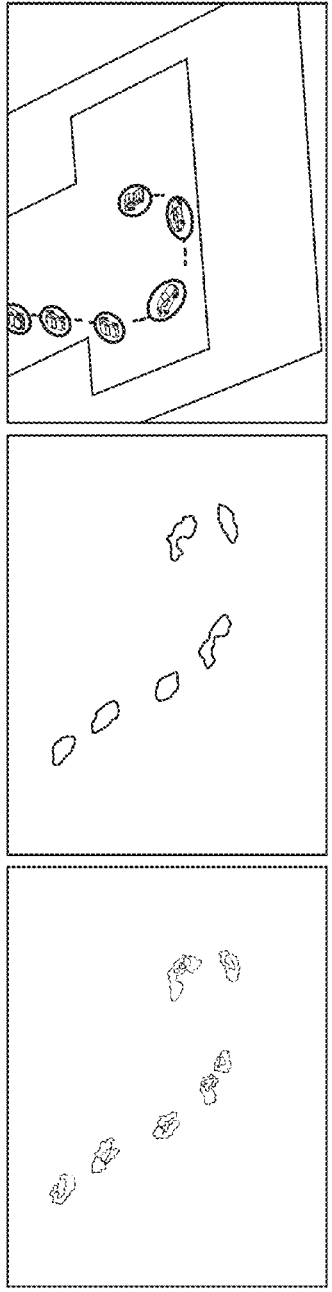
FIG. 7A
FIG. 7B
FIG. 7C
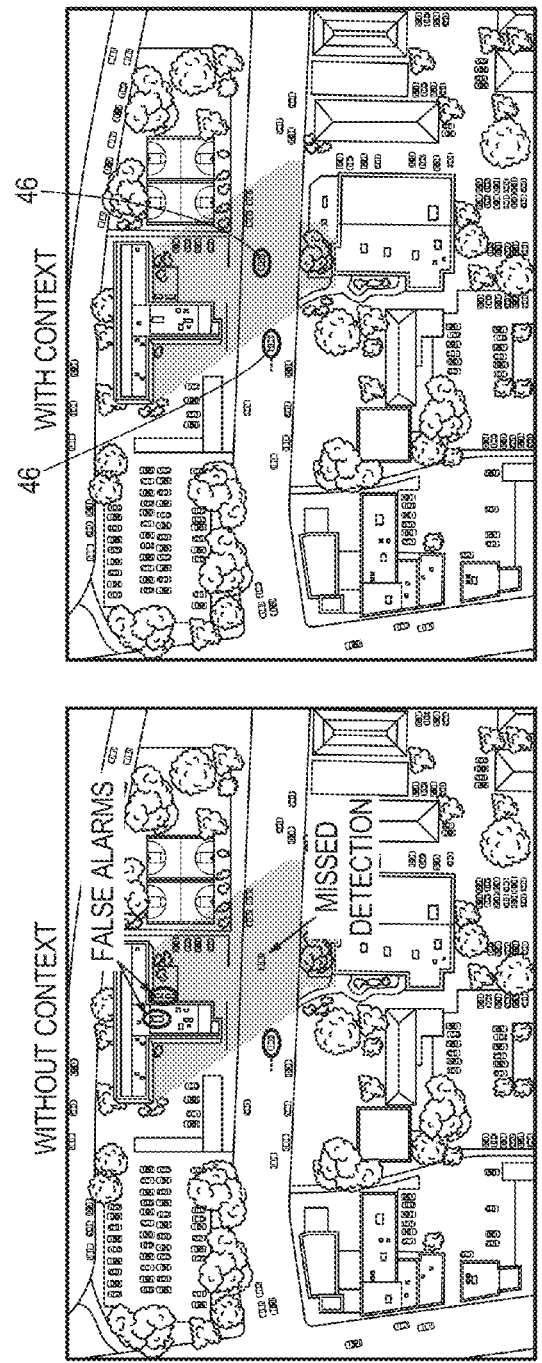
FIG. 8A
FIG. 8B

CONTEXT-AWARE OBJECT DETECTION IN AERIAL PHOTOGRAPHS/VIDEOS USING TRAVEL PATH METADATA

FIELD OF THE INVENTION

The present invention relates to real-time detection of a moving object of interest on a travel path, and reducing false alarms and missed detections. The present invention may also be used to track such a moving object in real-time.

BACKGROUND

Prior art systems for detecting and tracking an object of interest travelling on path, such as a travel path, using video tracking are known. Many of these systems, however, are limited in their accuracy of detecting an object in real-time due to environmental artifacts and image quality resulting from lighting effects on the object of interest. As a result, current systems may not adequately track an object of interest in certain environments.

SUMMARY

A system and a method for real-time detection of a moving object on a travel path in a geographical area is provided. The system and method may also be used to track such a moving object in real-time. The system includes an image capturing device for capturing successive images of a geographical area, a geographical reference map comprising contextual information of the geographical area, and a processor configured to calculate differences between successive images to detect, in real-time, a moving object on the travel path. The method includes capturing successive images of the geographical area using the image capturing device, geo-registering at least some of the successive images relative to the geographical reference map, and calculating differences between the successive images to detect, in real-time, an object.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

FIGS. 7A-7C show an example of a moving object detection of the present invention;

FIG. 8A shows a moving object detection without using travel path metadata; and

FIG. 8B shows a moving object detection using travel path metadata in accordance with the present invention.

DETAILED DESCRIPTION

Figure 1:
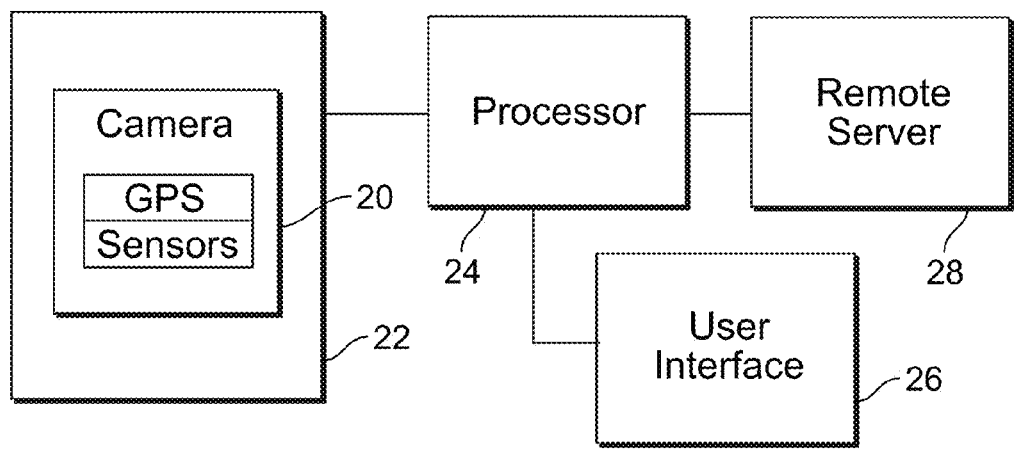
FIG. 1 is a block diagram of the system which incorporates the features of the present invention.
Figure 2:
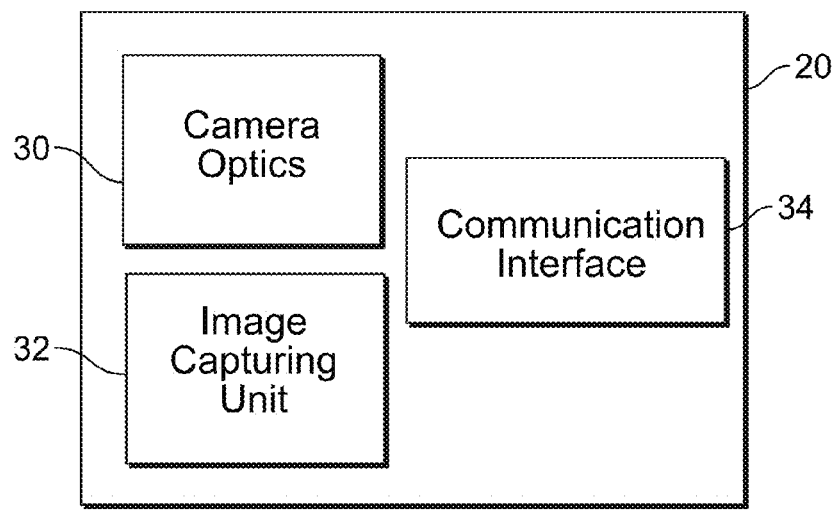
FIG. 2 is a block diagram of an image capturing device used in the system of the invention.
Figure 3:
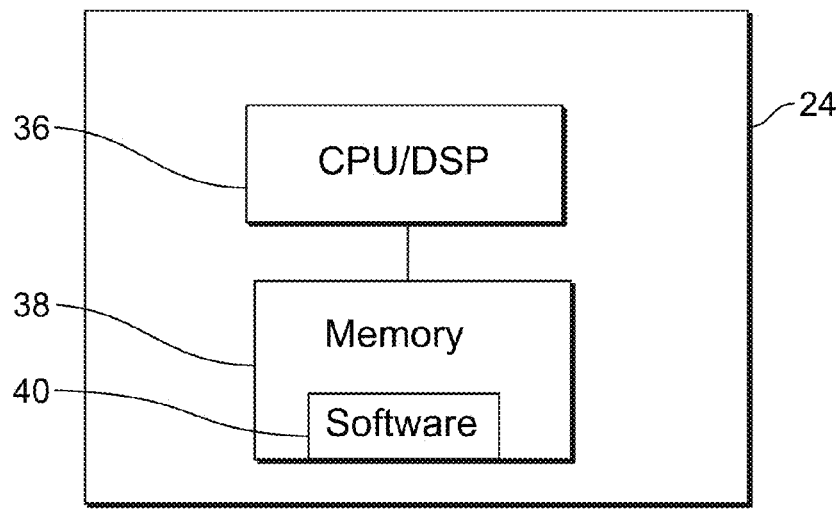
FIG. 3 is a block diagram of a processor used in the system of the invention.

While the invention may be susceptible to embodiment in different forms, there is shown in the drawings, and herein will be described in detail, a specific embodiment for detecting of a moving object of interest on a travel path using an image capturing device mounted on an aerial structure, such as an unmanned aerial vehicle (UAV), an aerial platform or a piloted vehicle, with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

A system and method for geo-registration and context aware moving object detection along a travel path, using images taken from an aerial location, to improve detection of a moving object on a travel path, and reducing false alarms and missed detections. The system and method may also be used to track such a moving object. The method may be performed in real-time. By combining geo-registration information with travel path metadata provided by a global mapping system, the accuracy of the system may be increased over the prior art.

As illustrated by the block diagram in FIG. 1, the system comprises an image capturing device 20, such as a camera, for generating digital images of a geographic area that may contain at least one travel path, an aerial structure 22, such as a platform on unmanned aerial vehicle (UAV) or on a piloted vehicle, such as a helicopter, for mounting the image capturing device 20, a processor 24 having software therein in communication with the image capturing device 20 and capable of processing images from the image capturing device 20, a user interface 26 in communication with the processor 24, and a server 28 which houses the travel path metadata from the global mapping system and which is in communication with the processor 24.

The image capturing device 20 is configured to capture digital images, such as photographs or a video of objects, such buildings, vegetation and vehicles, etc., disposed within the field of view of the image capturing device 20. The image capturing device 20 is communicatively connected to the processor 24. The image capturing device 20 includes image capturing device optics 30, an image capturing unit 32 and a communication interface 34. The image capturing device optics 30 comprises lenses and other optical components, and is communicatively coupled with the image capturing unit 32. The image capturing unit 32 transfers images to the communication interface 34 which then transfers the images to the processor 24.

The processor 24 and the server 28 are coupled together to transmit information therebetween. The information is sent to and received from the server 28, e.g., through a communication network such as a local area network, a wide area network, a wired network and/or a wireless network, etc. The server 28 can be on-board the aerial structure 22 or can be ground-based.

The processor 24 can be on-board the aerial structure 22, or can be ground-based. If the processor 24 is on the ground, the image capturing device 20 can send images to the processor 24 via wireless signals. The processor 24 processes image information from the image capturing device 20 and from the server 28 and includes a central processing unit (CPU) or digital-signal processor (DSP) 36 and memory 38. The CPU/DSP 36 is coupled to the memory 38 that includes random access memory (RAM) and read-only memory (ROM). The memory 38 is non-transitory and stores machine-readable, machine-executable software code 40 containing instructions that are configured to, when executed, cause the CPU/DSP 36 to perform various functions described herein. The processor 24 analyzes the information from the image capturing unit 32 to produce images which can be displayed on the display of the user interface 26 and which can be printed using the printer of the user interface 26 and analyzed by the user.

The user interface 26 includes an input device, such as a keyboard, a display and speakers to provide visual and audio information to a user and to allow the user to input parameters into the processor 24. The user interface 26 may also include a printer for printing images captured by the system.

Figure 4A:
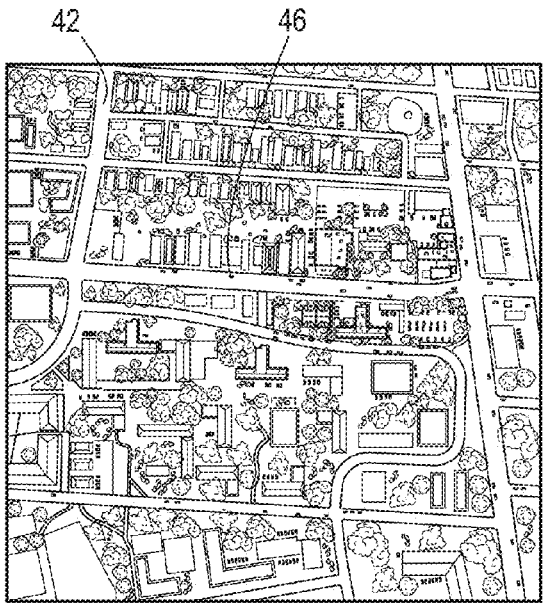
FIGS. 4A-4D are line drawings showing a reference map and images taken by the image capturing device in the system of the invention.

Global mapping systems, for example Google Maps, Bing Maps or any other suitable global mapping system that utilizes geo-positioning information, provides extensive travel path metadata for use by third parties. The travel path metadata provides, among other items, contextual information regarding the location of travel paths, such as roads, waterways and/or walking paths, and structures, such as buildings, vegetation and other potentially interfering objects, proximate to the travel paths. This travel path metadata may be provided as reference maps to third parties. A line drawing example of such a reference map 42 is shown in FIG. 4A showing travel paths, e.g. the roads in this particular reference map, in a geographic area. The travel paths are shown in shaded lines in FIG. 4B. The mapping information may be obtained on-line, e.g. via an Internet connection, and/or off-line, e.g. via storage media, e.g. electrical, magnetic or optical disc. This travel path metadata and its associated reference maps may be housed in the server 28. Alternatively, this travel path metadata and its associated reference maps may be housed in the processor 24.

A plurality of digital images, such as photographs or a video sequence, may be taken by the image capturing device 20. The images may then be transmitted to the processor 24 for processing. In an embodiment where photographs are taken, the processor 24 may be configured to separate the photographs into individual images 44a, 44b, 44c etc. In an embodiment where video is taken, the processor 24 may be configured to separate the video sequence into individual images 44a, 44b, 44c etc.

The processor 24 may be configured to access the server 28 to obtain an appropriate reference map 42, see FIG. 4A, containing geo-registration information. The processor 24 may be configured to compare the images from the image capturing device 20 to the reference map 42. The processor 24 may then geo-register the images to the reference map using matching of image features and planar homography.

During the geo-registration process, the first image 44a may be manually registered to the reference map 42 by the user inputting the registration information into the processor 24 via the user interface 26. Alternatively, the processor 24 may be configured to register the first image 44a to the reference map 42 in an automated manner by using inputs such as GPS and/or inertial sensors built into the image capturing device 20. In the present system and method, it is assumed that there is a dominant plane on the images 44a, 44b, 44c etc. and the reference map 42, hence, the processor 24 may be configured to use planar homography to align the images 44a, 44b, 44c etc. to the reference map 42.

Figure 6A:
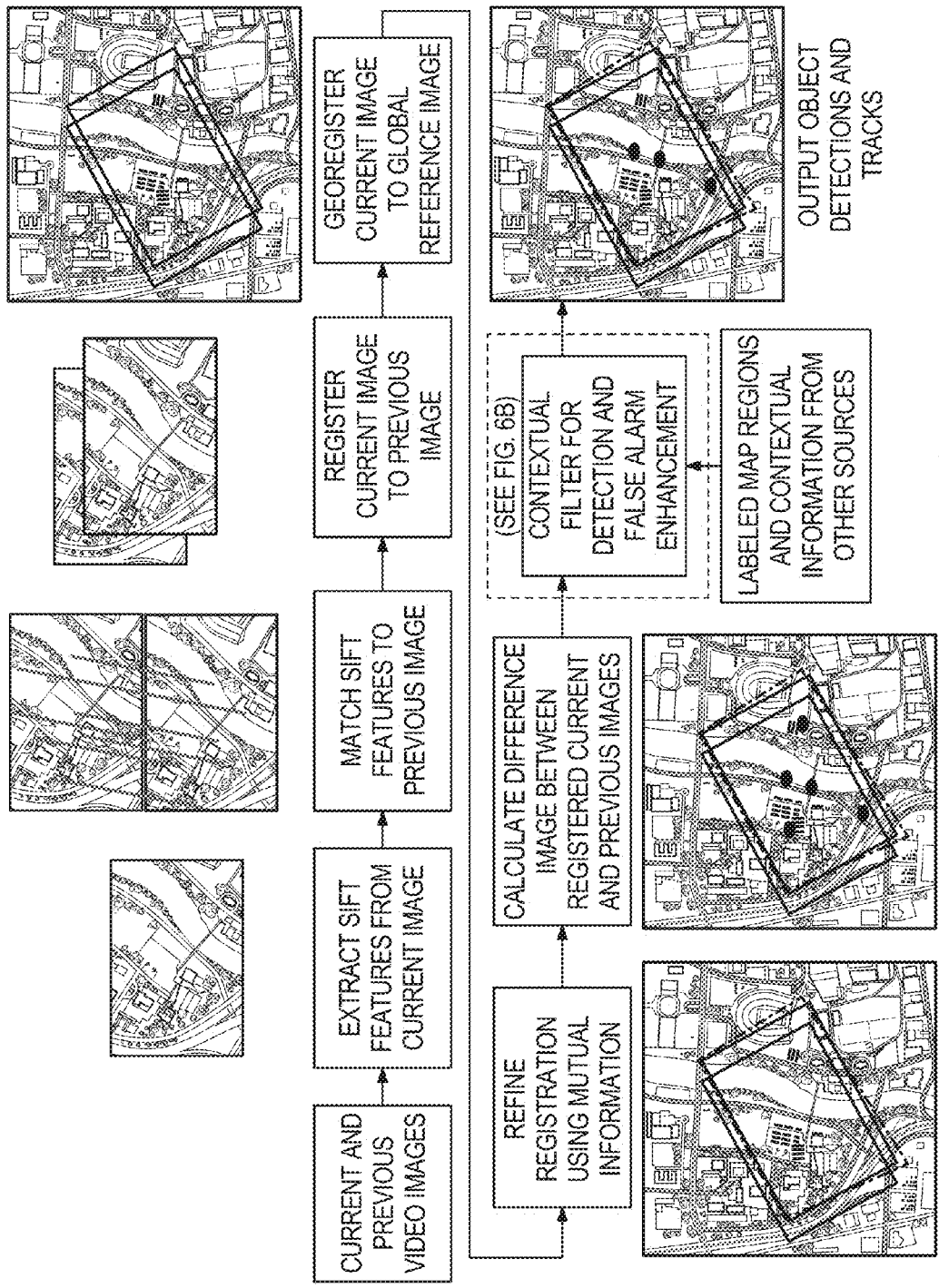
FIGS. 6A and 6B are line drawings with associated flow charts showing the steps used in the present method.

In the following, $H_{O,M}$ is the homography which aligns the first image 44a to the reference map 42. Given the registration of the first image 44a, subsequent images 44b, 44c . . . are geo-registered as follows. $I_t$ is defined as the image captured by image capturing device at time t, and $I_{t+1}$ is defined as the subsequent image. As shown in FIG. 6A, image to image registration is performed in a known manner by extracting scale-invariant feature transform (SIFT) descriptors, or other known descriptors, from the images in both images (the current image being analyzed and the previous image already analyzed). An initial set of correspondences is obtained by matching SIFT descriptors from the images in both images via their nearest neighbor in Euclidean space. These putative correspondences contain many incorrect matches, these are pruned via known methods, such as random sample consensus (RANSAC, described by Fischler, and Bolles, Comm. of the ACM, Vol. 24, pp. 381-395, 1981), or other method to estimate parameters of a mathematical model from a set of observed data which contains outliers, which also provides $H_{t+1,t}$, which is the homography that aligns $I_{t+1}$ to $I_t$. As a result, the subsequent image $I_{t+1}$ is geo-registered via the following product $H_{t+1,t} H_{t,t-1} H_{t-1,t-2} \ldots H_{1,O} H_{O,M}$ or more simply $\Pi_{\{k=1\}}^t H_{k,k-1} \cdot H_{O,M}$. The processor 24 may be configured to geo-register each successive image, or may be configured to geo-register predetermined ones of the images (e.g. some successive images are skipped).

The above method can introduce small errors in each homography computation, which errors accumulate over time and can result in misaligned images after some time. These errors are mitigated by refining the image to image registration with an additional image to reference map registration. At time t, it is assumed that the image It to be geo-registered is within a small error bound. The geo-registration is refined by matching interest points in It and the reference map 42 via mutual information of the image patches. Mutual information is a measure of the information overlap between two signals, or how much knowledge of one signal can provide knowledge of second signal. Mutual information is robust and useful because it is only sensitive to whether one signal changes when the other signal does not, not to their relative values. Since the reference map 42 and the image being analyzed were taken at different times, there can be complicating factors such as different time of day, different weather conditions, etc, along with the fact that the image being analyzed may have been taken at a different angle than the image in the reference map 42. Mutual information helps to mitigate these complicating factors. As a result, the accumulation of errors and geo-registration "drift" are nullified.

Figure 4B:
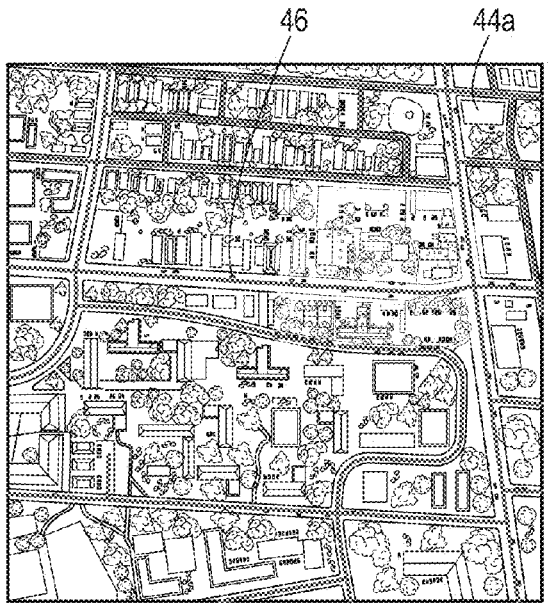
Figure 4C:
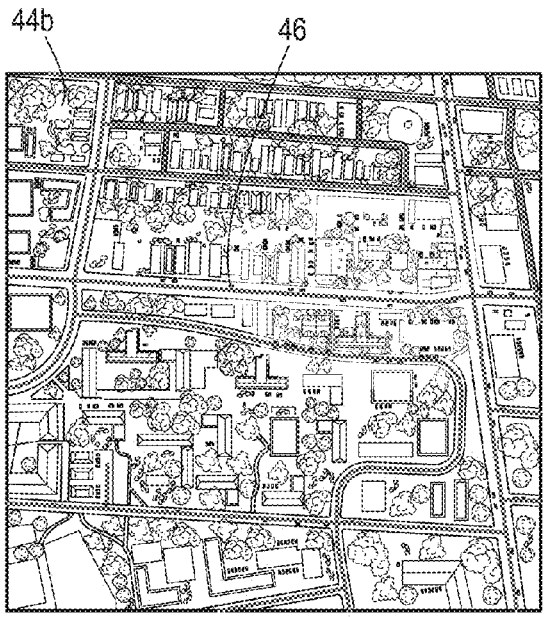
Figure 4D:
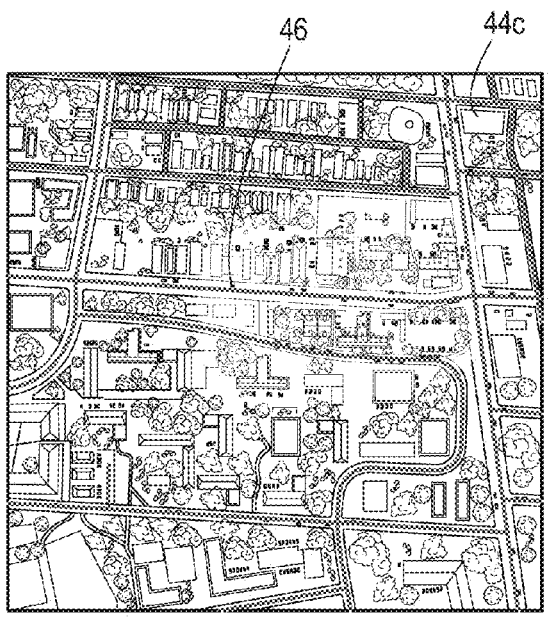
Figure 5:
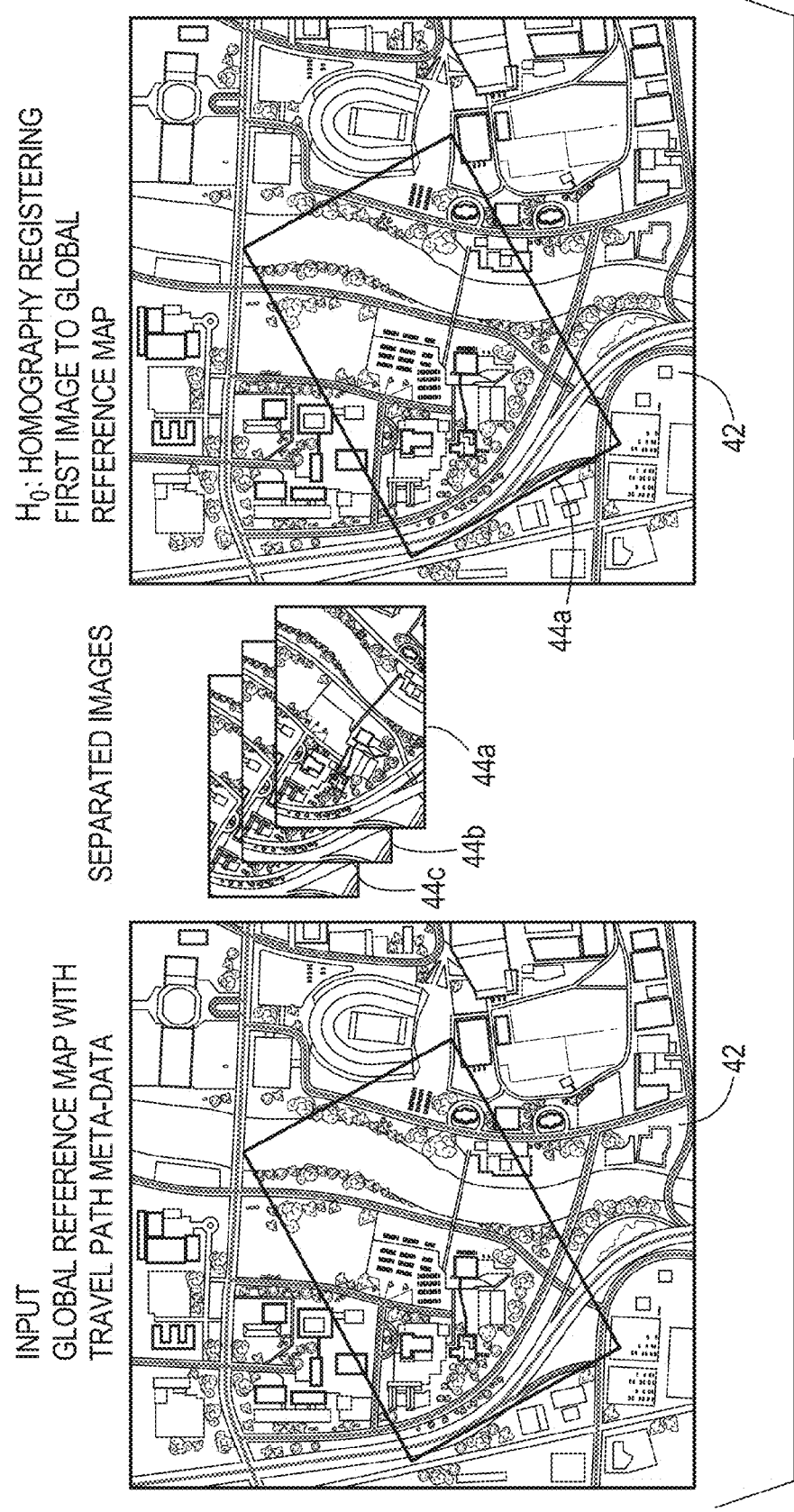
FIG. 5 are line drawings showing how the images are geo-registered to the reference map using planar homography in the system of the invention.

An example of a geo-registered video sequence can be seen in FIGS. 4A-4D. FIG. 4A shows the reference map 42. FIG. 4B shows the first image 44a registered to the reference map 42. FIGS. 4C and 4D show subsequent images 44b, 44c registered to the reference map 42. The travel paths are shown in shaded line using travel path metadata obtained from the reference map 42.

Once the images etc. are geo-registered, the processor 24 may be configured to use the travel path metadata from the reference map 42 as additional context for detecting a moving object of interest 46, for example a vehicle, in the images 44a, 44b, 44c etc. The moving object detection is performed by the processor 24 by calculating differences in consecutive images, for example, 44a and 44b, after they have been geo-registered to the reference image 42 by using coarse background subtraction in a known manner. $I_t$ is defined as the reference image 42, then images $I_{t-k}$, $I_{t-(k-1)}, \ldots I_{t-1}, I_{t+2}, \ldots, I_{t+k}$ are registered using $I_t$ as the reference coordinate system. The pixel squared difference is then accumulated between the reference image 42 and all other images 44a, 44b, 44c, in other words $\text{Diff}=\Sigma_{i=t-k}^{t+k}(I_t-I_i)^2$, typically k=2. The assumption is that since all images 44a, 44b, 44c are registered to the reference image 42, stationary objects and the background will cancel each other out in the squared difference operation, whereas a moving object 46 will stand out. A sensitivity threshold T is applied to the accumulated difference image to produce a binary image B where $$B(x, y) = \begin{cases} 1 & \text{if } \textit{Diff}(x, y) > T \\ 0 & \text{otherwise} \end{cases}.$$

Figure 6B:
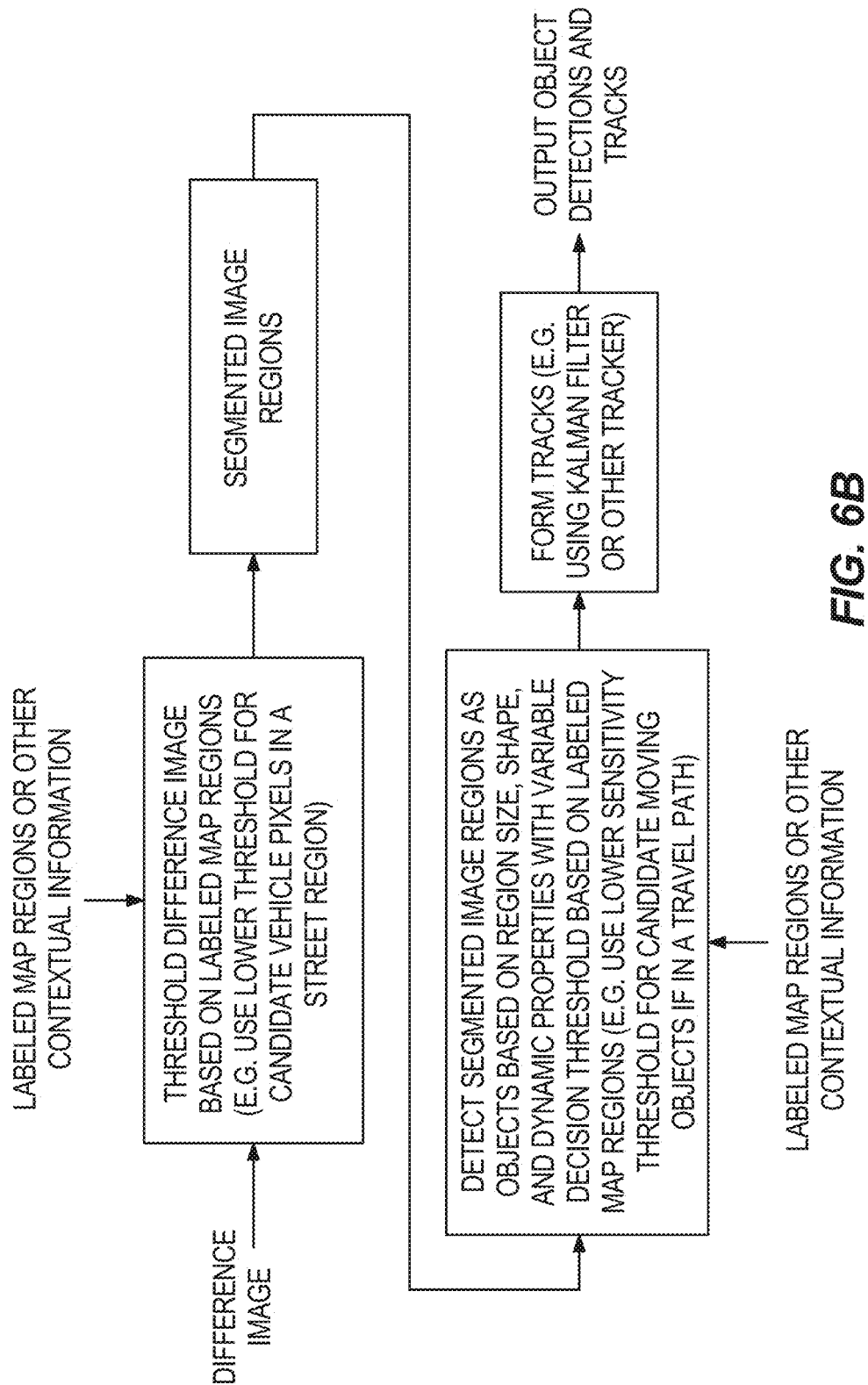

In FIG. 6B, once the difference image is calculated, the processor 24 is configured to perform the thresholding operation on the accumulated difference image based upon the labeled map regions, resulting in segmented image regions that represent objects moving faster than a certain speed relative to the background. By varying the threshold T, the sensitivity to motion can be made dependent on the labeled map region that contains the segmented image regions. For example, a lower sensitivity threshold is used for a candidate moving object in the travel path versus a candidate moving object outside of the travel path. Next, the processor 24 may be configured to detect the segmented image regions as objects based upon the region size, shape and dynamic properties with variable decision threshold based upon the labeled map regions. Thereafter, the processor 24 may be configured to form tracks, for example by using a Kalman filter in a known manner, or another suitable known tracker. As a final step, the processor 24 may be configured to output the object detections and the tracks to the user.

An example of the moving object detection and tracking process is provided in FIGS. 7A-7C. FIG. 7A shows the accumulated difference image. FIG. 7B shows the segmented regions after processing the accumulated difference image of FIG. 7A, e.g. with thresholding and morphological operations. Such morphological operations are well-known in the art. FIG. 7C shows the object tracking results. Each tracked object of interest 46 may be represented by a fitted ellipse, e.g. an ellipse of a specific color. A history of previous locations of the tracked object of interest 46 may be shown as trailing dots of the same color.

In addition, once the images etc. are geo-registered, the processor 24 may be configured to use the travel path metadata to suppress false alarms for detections that are not on a travel path. Once a moving object of interest 46 is detected, the method performs the steps of FIG. 6B which uses travel path metadata to filter out false alarms and enhance missed detections. The false alarm rate is reduced by using only the travel path metadata (reducing search area) because the number of false alarms per image is approximately proportional to the search area. If the search area is reduced using travel path metadata, then the false alarm rate will decrease while the detection rate of a moving object will stay unchanged. If the sensitivity threshold is lowered, the detection rate of a moving object will increase and the false alarm rate will also increase from the value it was lowered to using the travel path metadata. For example, the sensitivity threshold can be lowered so that the false alarm rate is unchanged from the rate without metadata. The detection rate will then be higher due to the lower sensitivity threshold value. The false alarm rate can be kept constant by lowering the sensitivity threshold and reducing the search area. In this method, the accumulated difference image is thresholded and converted to a binary image. If the search area is reduced, the false alarm rate is kept constant by lowering the sensitivity threshold.

The user sets the sensitivity threshold T in the processor 24 for detection of an object of interest 46. The sensitivity threshold T may be set, for example, by the user setting a predetermined level of contrast in the images between the moving object and the structure that the moving object is on, or may be set, for example, by the user setting a predetermined pixel count for the a moving object. The sensitivity threshold T may be set lower in the regions where a travel path is located, which regions are known from the reference map 42, and higher in any non-travel path region. For example, the processor 24 may be configured to recognize that a moving object is darker than the travel path or the buildings in the images, and/or the processor 24 may be configured to recognize that a moving object is lighter than the travel path in the images or the buildings. Or, for example, the processor 24 may be configured to recognize that a moving object has a higher pixel count than the travel path. If, however, the user sets the sensitivity threshold T too low (requiring a small amount of contrast or small difference in pixel count between the moving object and the structure that the moving object is on), this may result in an unacceptable number of false alarms, because many objects will meet this setting. If, however, the user sets the sensitivity threshold T too high (requiring a great amount of contrast or large difference in pixel count between the moving object and the structure that the moving object is on), this may result in missed detections because objects in the shadow of a building will not show a high level of contrast between the moving object and the travel path or a high difference in pixel count. In the present invention, since travel path metadata is used by the processor 24 as context, false alarms in areas outside of the travel path are suppressed. At the same time, missed detections on the travel path are reduced because the lower sensitivity threshold is used in the moving object detection process in the travel path. A lower sensitivity threshold effectively boosts the sensitivity of the moving object detection process. In the examples shown in FIGS. 7A through 8B, the assumption is that the moving object of interest 46 to be detected is a vehicle which are typically on the travel path, and not typically off of the travel path.

FIGS. 8A and 8B illustrate some of the difficulties that may be encountered when processing images 44a, 44b, 44c taken in an urban environment. The tall buildings and vegetation are not on the ground plane and therefore cannot be aligned using the planar homography. As a result, the squared difference operation can introduce false alarms and missed detections such as the ones seen in FIG. 8A. A false alarm may result from a moving object in the images which is not on the travel path. A missed detection may arise when a moving object of interest is in the shadow of a tall building and is not easily detected by the image capturing device 20 and processor 24. By using the travel path metadata as additional context, such false alarms and missed detection are mitigated by using the method in FIG. 6B.

As described above, the travel path metadata may also be used to increase the sensitivity of the moving object detection process in areas inside the travel path. As seen in FIG. 8A, a moving vehicle is undetected in the shadow of the tall building. This is due to the low contrast of the image in that area. By lowering the sensitivity threshold of the detection process in the regions where a travel path is located, this moving vehicle is detected.

Once a moving object of interest 46 is detected, the processor 24 may be configured to track the location of the moving object of interest 46 over time. Alternatively, once a moving object of interest 46 is detected, the user may input instructions into the processor 24 via the user interface 26 to track that specific moving object of interest 46. The processor 24 may be configured to detect a moving object of interest 46 in the successive images 44a, 44b, 44c by appearance, location, velocity, etc.

Since the images 44a, 44b, 44c are geo-registered, the detected moving object of interest 46 has precise geo-coordinates. This enables a user to easily detect and track the moving object of interest 46.

The present invention can be used to detect and track multiple moving objects of interest in the images 44a, 44b, 44c. These multiple moving objects of interest may be on the same travel path in the images 44a, 44b, 44c. Alternatively, one or more of the multiple moving objects of interest may be one travel path in the images 44a, 44b, 44c, and another one or more of the multiple moving objects of interest may be a different travel path in the images 44a, 44b, 44c, etc.

While particular aspects of the present subject matter described herein have been shown and described, it will be apparent to those skilled in the art that, based upon the teachings herein, changes and modifications may be made without departing from the subject matter described herein and its broad aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A method for real-time detection of an object, the method comprising:
    capturing, using an image capturing device, successive images of a geographical area containing at least one travel path;
    geo-registering at least some of the successive images relative to a geographical reference map comprising contextual information of the geographical area, the contextual information comprising travel path metadata associated with the at least one travel path;
    calculating differences between the successive images to thereby detect an object in real-time;
    calculating, using the travel path metadata as additional context for the detected object, an accumulated pixel squared difference image between the geographical reference map and the successive images; and
    applying a predefined sensitivity threshold to the accumulated pixel squared difference image to thereby produce a binary image.

2. The method of claim 1, further comprising:
    receiving registration information via a user interface, wherein a first image of the successive images is manually geo-registered using the received registration information.

3. The method of claim 1, further comprising:
    acquiring the geographical reference map by obtaining images of the geographical area including the at least one travel path.

4. The method of claim 1, wherein the at least one travel path comprises a road.

5. The method of claim 1, wherein the image capturing device is positioned on an aerial structure.

6. The method of claim 1, wherein capturing the successive images of the geographical area comprises:
    capturing at least one video sequence including the geographical area; and
    separating the video sequence into the successive images.

7. The method of claim 1, wherein geo-registering the at least some of the successive images relative to the geographical reference map is performed using planar homography.

8. The method of claim 1, further comprising:
    using the contextual information to suppress false detections of one or more moving objects outside of the at least one travel path.

9. The method of claim 1, further comprising:
    using the contextual information to detect a moving object on the at least one travel path.

10. The method of claim 1, wherein geo-registering at least some of the successive images relative to a geographical reference map comprises:
    performing a first geo-registration between the at least some of the successive images; and
    performing a second geo-registration between at least one of the at least some successive images relative to the reference map, wherein the second geo-registration operates to reduce errors introduced during the first geo-registration.

11. The method of claim 1, wherein the detected object comprises a moving object, the method further comprising tracking the position of the moving object.

12. A system for real-time detection of a moving object on a travel path in a geographical area, the system comprising:
    an image capturing device for capturing successive images of the geographical area;
    a geographical reference map comprising contextual information of the geographical area, the contextual information comprising travel path metadata associated with the travel path; and
    a processor configured to:
        calculate differences between the successive images to thereby detect, in real-time, a moving object on the travel path;
        calculate, using the travel path metadata as additional context for the detected moving object, an accumulated pixel squared difference image between the geographical reference map and the successive images; and
        applying a predefined sensitivity threshold to the accumulated pixel squared difference image to thereby produce a binary image.

13. The system of claim 12, wherein said image capturing device is a video camera.

14. The system of claim 13, wherein said detected moving object is a vehicle and said travel path is a road.

15. The system of claim 12, wherein the image capturing device is mounted on an aerial structure.

16. The system of claim 15, wherein the airborne structure comprises an aerial platform on an unmanned vehicle.

17. The system of claim 12, wherein the geographical reference map is housed in a server remote from the processor.

18. The system of claim 12, wherein the processor is further configured to track the position of the detected moving object.

19. A method for real-time detection of a moving object, the method comprising:
- capturing, using an image capturing device, a plurality of successive images of a geographical area including a travel path;
- geo-registering at least a portion of the plurality of successive images with a geographical reference map comprising contextual information associated with the geographical area, the contextual information comprising travel path metadata associated with the travel path;
- calculating differences between the plurality of successive images to thereby detect a moving object in real-time; and
- selecting a sensitivity threshold value based on whether the detected moving object is determined to be within the travel path,
- wherein a lesser sensitivity threshold value is selected when the detected moving object is within the travel path, and a greater sensitivity threshold value is selected when the detected moving object is outside the travel path, and
- wherein the sensitivity threshold value is selected to provide a predetermined false alarm rate.

* * * * *